Figure 1:
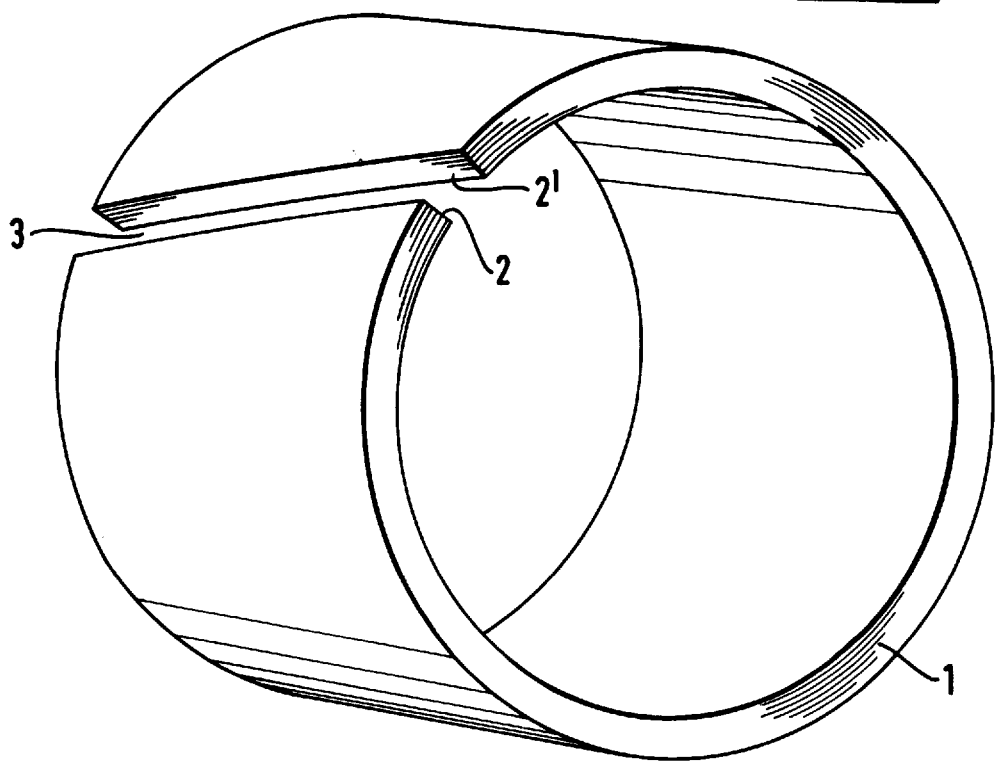

United States Patent
Lorenz et al.

[19]

[11] Patent Number: 5,880,043
[45] Date of Patent: Mar. 9, 1999

[54] FIBER-REINFORCED MATERIAL AND PRODUCTION AND USE THEREOF

[75] Inventors: Georg Michael Lorenz, Königstein; Elke Gebauer, Bobingen; Ulrich Schuster, Regensburg; Manfred Tschacher, Emmerting; Burghard Schönrogge, Bruchköbel, all of Germany

[73] Assignee: Hoechst Aktiengesellschaft, Germany

[21] Appl. No.: 742,341

[22] Filed: Nov. 1, 1996

Related U.S. Application Data

[62] Division of Ser. No. 323,148, Oct. 14, 1994, abandoned, which is a continuation of Ser. No. 019,086, Feb. 18, 1993, abandoned, which is a continuation of Ser. No. 679,916, Apr. 3, 1991, abandoned.

[51] Int. Cl.$^6$ .................................................. B23P 25/00
[52] U.S. Cl. ............................ 442/94; 442/97; 442/98; 442/147; 442/148; 442/164; 442/229; 384/99; 384/300; 384/908; 428/402; 428/408; 428/409
[58] Field of Search .................................. 442/94, 97, 98, 442/229, 147, 148, 164; 384/99, 300, 908; 428/402, 408, 409

[56] References Cited

U.S. PATENT DOCUMENTS

| | | |
|---|---|---|
| 3,684,062 | 8/1972 | Johnson . |
| 4,674,164 | 6/1987 | McCloskey ............................ 29/149.5 |

FOREIGN PATENT DOCUMENTS

| | | |
|---|---|---|
| A 0 062 179 | 10/1982 | European Pat. Off. . |
| A 25 10 599 | 10/1975 | Germany . |
| 2 171 356 | 2/1985 | United Kingdom . |
| 974629 | 8/1986 | United Kingdom . |

OTHER PUBLICATIONS

Engineering Plastics and Composites, p. 175, ASTM International, 1990.
Engineering Plastics and Composites, 1990, pp. 188, 355, Section II pp. 94 & 95.
Derwent Publications Ltd., London, GB; AN 86–269591 & JP A 61 197 637 (Oiless Ind.Co.Ltd.)1 Sep. 1986.
Derwent Publications Ltd., London, GB; AN 80–00828C [01] & JP A 54 148 089 (Akatsuki Brake Kogy), 19 Nov. 1979.
Derwent Publications Ltd., London, GB; AN 76–86030X [46] & JP A 51 111 266 (Veb.Tech.Text.Karl.) 2 Oct. 1976.

*Primary Examiner*—Richard Weisberger
*Attorney, Agent, or Firm*—Connolly & Hutz

[57] ABSTRACT

There is described a fiber-reinforced material composed of a sheetlike textile material and a thermoset resin with a fiber content of from 30 to 70% by weight, at least 30% of the fiber being synthetic fiber.

The thermoset resin is preferably a phenolic resin which contains up to 25% by weight of a fluoropolymer.

The sheetlike textile material is preferably 100% synthetic fiber, in particular polyacrylonitrile fiber.

There are also described a prepreg formed from the textile material and the thermosetting resin and the process for producing these articles and the use of the material for producing construction elements, in particular for hydraulic systems, by application of mechanical shaping processes.

6 Claims, 1 Drawing Sheet

FIBER-REINFORCED MATERIAL AND PRODUCTION AND USE THEREOF

CROSS REFERENCE TO RELATED APPLICATIONS

This application is a division of application Ser. No. 08/323,148, filed on Oct. 14, 1994, now abandoned, which is a continuation of application Ser. No. 08/019,086, filed Feb. 18, 1993, now abandoned, which in turn is a continuation of application Ser. No. 07/679,916, filed Apr. 3, 1991, now abandoned.

The present invention relates to a fiber-reinforced material composed of a sheetlike textile material composed at least in part of synthetic fibers and a fluoro-polymer-containing thermoset resin, a prepreg for producing the fiber-reinforced material, and sheetlike or three-dimensional construction elements formed therefrom.

It is already known to manufacture construction elements such as guide and sealing collars and rings as preferred in hydraulic systems from thermosetting resins reinforced with cellulose fiber fabric (fabric-based laminate tape). However, these known construction elements are insufficiently flexible in practice; they frequently tend to delaminate and cause excessively high friction losses in various applications. Similarly, the heat resistance of these construction elements frequently leaves something to be desired in practice.

Considerable problems arise with guide rings specifically in hydraulic systems owing to the combined effect of high static and dynamic pressures, transient high edge loads and high working temperatures at the same time as the constant abrasive stress due to the gliding movements of the hydraulic elements in the presence of the swelling and solubilizing hydraulic fluid.

Guide elements made of a thermoplastic material which per se have good gliding and flexing properties and are more resistant to transverse forces, as may arise for example in the event of high edge loads, than more brittle materials quickly fail in hydraulic systems under the above-described working conditions. At low temperatures, as may arise for example in the winter operation of hydraulic systems, they become brittle, so that they are also easily destroyed by edge loads; at increasing temperatures they undergo plastic deformation.

It is also already known to use composite materials formed from metal powders and polytetrafluoroethylene for manufacturing slide and guide rings in order to exploit the good frictional properties of polytetrafluoroethylene.

However, under the high pressures of modern hydraulic systems these materials exhibit excessively high cold flow, so that they are not even usable at standard temperature, let alone under the customary operating temperatures of these systems.

British Patent 974,629 discloses a process for manufacturing bearings using a material comprising a thermosetting resin reinforced with a fabric strip. To reduce the friction losses on using these known bearing elements, polytetrafluoroethylene powder is embedded in the surface of the material in the course of the forming process.

British Patent 1,031,406 discloses a composition for producing low friction coefficient protective coatings on substrates such as wood or steel. This composition consists essentially of a curable resin, for example a thermosetting phenol-formaldehyde resin, which contains low molecular weight fluoropolymers in finely divided form.

A similar composition for producing low friction coefficient protective coatings and a process therefor are disclosed in German Patent 1,250,035.

The present invention, then, provides a fiber-reinforced material from which it is possible to produce construction elements having a relatively low friction coefficient and a high pressure and abrasion resistance, appreciably improved flexibility, extensibility, shear resistance and delamination resistance and high temperature resistance and which at the same time are inert toward solubilizing and/or swelling fluids, for example hydraulic or lubricating fluid, and which therefore are suitable for use in particular for example as guide elements in highly sressed hydraulic systems or for fabrication of bearings, in particular slide bearings.

The fiber-reinforced material of the present invention comprises a sheetlike textile material and a thermoset resin and has a fiber content of from 30 to 70% by weight, preferably from 40 to 60% by weight, in particular from 45 to 55% by weight, at least 30%, preferably at least 50%, in particular at least 80%, of the fiber material present therein being synthetic fiber. The thermosetting resin used can in principle be any known crosslinkable, i.e. curable or settable, resin system, in particular for example a phenolic resin, but also a melamine resin, epoxy resin or alkyd resin. Preference is given to using a thermosetting resin which contains up to 25% by weight, preferably from 5 to 20% by weight, in particular from 5 to 10% by weight, of a fluoropolymer. Particular preference is given to a fiber-reinforced material of the present invention whose fiber material is 100% synthetic fiber.

Suitable sheetlike textile materials for inclusion in the fiber-reinforced material of the present invention are woven or knitted fabrics or webs. The fiber material of the sheetlike textile structures can be present in smooth or crimped (textured) form and in the form of staple fibers, staple fiber yarns or multifilament yarns. If the sheetlike textile material present in the material of the present invention is a web material, the fiber material will in general be crimpled staple fiber. The staple length of these fibers is in general between 20 and 200 mm. Having regard to special strength requirements, it is particularly advantageous to use staple fibers from about 60 to 150 mm in length. Of particular advantage for the purposes of the present invention are web materials composed of staple fibers having an average staple length of from 40 to 120 mm. The webs used in the materials of the present invention may advantageously be preconsolidated by heat treatment, for example by calendering, in particular with embossed calenders, or with a binder, for example with a thermosetting binder or with binder filaments having a relatively high melting point, or else by mechanical means, for example by needling.

The woven and knitted structures may be formed from smooth or preferably textured multifilament yarns but preferably from spun staple fiber yarns. For the purposes of the present invention a textured yarn is any conventionally structured yarn, in particular a fancy yarn, such as a loop yarn, which, owing to hairs and loops protruding from the yarn surface or due to slubs or knops introduced in the course of production, improve the adhesion to the matrix resin. The sheet weight of the sheetlike textile component of the material of the present invention is advantageously within the range from 100 to 280, preferably from 120 to 250, in particular within the range from 120 to 150, g/m$^2$.

Particular preference is given to those materials of the present invention whose textile sheet structure comprises a 100% synthetic staple fiber yarn. The staple fiber yarn may in turn be a single yarn or a folded yarn and it may exhibit other known spinning or twisting effects.

The fiber content of the material according to the present invention is at least 30% synthetic. Suitable natural fibers for inclusion in the material of the present invention are in particular cellulose fibers, for example cotton or jute fibers. The synthetic fiber of which the sheetlike textile component of the material of the present invention is predominantly or preferably exclusively composed can in principle be any known high-strength, high-modulus, adequately heat-resistant synthetic fiber, for example partly or wholly aromatic polyamide fiber, partly or wholly aromatic polyester fiber, high-tenacity polyacrylonitrile fiber in oxidized or non-oxidized form, or else carbon fiber. As far as the price/performance ratio is concerned and having regard to the adhesion between the fiber material and the thermosetting resin, it is particularly advantageous for the thermosetting resin used to be a phenolic resin and for the textile sheet material to be composed of polyester fiber, in particular polyethylene terephthalate, or polyester/cellulose fiber blend yarns, but in particular and preferably for the textile sheet material to be composed of polyacrylonitrile fiber. It is particularly preferred to use the high-tenacity grades of these synthetic fibers. As mentioned earlier, the synthetic fibers may be in crimped or non-crimped form and in continuous filament or staple fiber form, depending on the nature of the textile sheet material. The linear density of the synthetic fiber is advantageously from 1 to 9 dtex, preferably in the case of polyacrylonitrile fiber grades within the range from 1.7 to 6.7 dtex, in particular from 2 to 3 dtex.

For other high temperature resistant fibers the linear density ranges should be approximately the same, as can be determined for any particular case in preliminary experiments. The tenacity of the preferred high-tenacity grades is in the case of polyethylene terephthalate within the range from 65 to 75 cN/tex, in the case of high-tenacity polyacrylonitrile grades above 55 cN/tex, for fiber linear densities between 2 and 3 dtex, and above 43 cN/tex for fiber linear densities within the range above 5 dtex. The breaking extension of the preferred synthetic fibers is for polyethylene terephthalate within the range from 14 to 17%, for the particularly preferred polyacrylonitrile fiber grades within the range from 13 to 16%, in the case of individual fiber linear densities between 2 and 3 dtex and about 14 to 17% in the case of individual fiber linear densities above 5 dtex.

Particularly preferred materials of the present invention contain sheetlike textile materials, in particular woven fabrics or webs, made of the highly drawn, non-oxidized polyacrylonitrile fibers which are commercially available for example as ®Dolanit in types 12 and 15. They are crimped long-fiber grades (staple length about 60–100 mm) which are characterized by good adhesion within the yarn structure and therefore are readily processible into yarns/fabrics and webs. Compared with textile polyacrylonitrile fibers, such high-tenacity fibers are almost twice as strong and are highly resistant to chemicals and heat. A particularly preferred embodiment of the material of the present invention contains for example a knitted in particular a woven fabric formed from a crimped, folded staple fiber yarn spun from the high-tenacity polyacrylonitrile grade ®Dolanit 15 or else a web composed of crimped high-tenacity polyacrylonitrile staple fibers of type ®Dolanit 12.

As mentioned earlier, the thermosetting resin used is preferably a phenolic resin.

The phenolic resin component of the fiber-reinforced materials of the present invention comprises known condensation products of phenol and phenol derivatives with formaldehyde. Suitable phenol derivatives are in particular substituted phenols, in particular alkyl-substituted phenols such as cresols, xylenols and other alkylphenols such as p-tert-butylphenol, octylphenol and nonylphenol, but also arylphenols, such as phenylphenol, naphthols and 2-hydric phenols such as resorcinol and bisphenol A. Phenolic resins for the purposes of this invention include not only the condensation products of the individual compounds mentioned but also condensation products of mixtures of the abovementioned phenols and phenol derivatives with formaldehyde. If individual compounds are to be used for preparing the phenolic resins, it must be borne in mind that they must be at least triple functional toward formaldehyde. To optimize particular properties the phenolic resins mentioned may also have been modified in a conventional manner with additions of unsaturated natural or synthetic compounds, for example tung oil, rosin or styrene. Particular preference is given to condensation products of formaldehyde with phenol itself and mixtures of phenol with minor amounts of the phenol derivatives mentioned, in particular the alkyl-substituted phenols mentioned.

The phenolic resins present in the materials of the invention have a molar ratio of phenol to formaldehyde of from 1:1 to 1:3, preferably from 1:1.2 to 1:2.2. Suitable phenolic resins are for example commercially available as Phenodur VPR 45.

Preferably, the thermosetting resin component of the materials of the present invention, in particular the phenolic resin, contains as mentioned earlier up to 25% of a fluoropolymer in finely divided form. Suitable fluoropolymers are in particular polytetrafluoroethylene grades of a moderate molecular weight of from about 20,000 to 500,000. Preferably, the molecular weight is within the range from 50,000 to 200,000. Fluoropolymers which are particularly suitable for the purposes of the present invention have a specific surface area between 5 and 15 $m^2/g$ coupled with a density of about 2.1–2.3 $g/cm^3$. Suitable polymers have a softening point at about 200° to 250° C. and melting points at about 325°–330° C. and a melt viscosity, measured at 380° C., of about $10^2$ to $10^5$ Pa.s (calculated according to Hagen-Poisseuille). Of particular importance is the average particle size of the fluoropolymer, which is advantageously within the range from 0.5 to 10 $\mu$m, preferably within the range from 2 to 7 $\mu$m. The particle size is advantageously measured in a wetting agent solution, for example in a Particle Size Analyzer from Hitachi. The particles of the fluoropolymer, preferably the polytetrafluoroethylene, should ideally be free of pores to minimize the buoyancy of the material in the phenolic resin mass.

Suitable fluoropolymer grades are for example commercially available as ®Hostaflon micropowders of grades TF 9205 and in particular TF 9202.

The phenolic resin present in the fiber-reinforced material of the invention preferably contains in addition to the fluoropolymer one or more substances which act as plasticizers or adhesion improvers, i.e. which widen the elasticity range of the resin and improve its bonding to the incorporated fiber materials. Such agents are advantageously present in the phenolic resin in an amount of from 1 to 15% by weight, preferably from 3 to 10% by weight, in particular from 4 to 7% by weight. Particularly suitable plasticizers and adhesion improvers are cocondensation products of the class of the polyamides and also derivatives of polyvinyl alcohol such as polyvinyl acetate, preferably polyvinyl butyral. For compatibility reasons particular preference is given to low-acetalized grades. Preferred phenyl butyral grades are soluble in lower aliphatic alcohols and have a degree of acetalization of from 60 to 75%, preferably from 68 to 72%, and a 6% strength methanolic solution of the preferred polyvinyl butyral has a viscosity of from 2 to 20, preferably from 4 to 6, mPa.s at 20° C.

The phenolic resin present in the materials of the invention may in addition to the stated additives contain further customary additives for phenolic resins such as defoamers, wetting agents, flow control agents or else further plasticizing agents and also latent curing agents. These additives—if their presence is desired—can be present in the resin in a proportion of up to 2% by weight, preferably within the range from 0.1 to 1% by weight.

Depending on the intended thickness of the construction elements which are to be manufactured from the fiber-reinforced materials of the present invention, said material comprises an appropriate number of layers of the sheetlike textile material.

The phenolic resin contained in the fiber-reinforced materials of the present invention is present therein in the fully cured, i.e. crosslinked, state. The present invention, however, also provides prepregs suitable for producing the fiber-reinforced material of the present invention. These prepregs differ from the above-described materials of the present invention in that in them the phenolic resin is present in the uncured state, hence ensuring the formability of the prepreg under heat and pressure, and in that in general they comprise just one layer of the sheetlike textile material. The degree of condensation of the phenolic resin is increased by a drying process to such an extent that the prepreg becomes non-tacky and thus is readily rolled up and that the flow and curing behavior of the resin is adapted to the production conditions for the material of the invention. The said fiber-reinforced material of the invention can be present in various geometrical forms, in particular in the form of semi-finished sheetlike or three-dimensionally shaped, for example tubular, products or else in the form of ready-produced sheetlike or three-dimensional construction elements.

Particular preference is given in particular to those embodiments of the material of the present invention which combine a plurality of the abovementioned preferred features.

The sheetlike or three-dimensional fiber-reinforced materials of the present invention are produced in a conventional manner by providing a length of the above-described sheetlike textile material in a suitable manner, for example by soaking, padding, brushing or coating, with a solution of an above-described thermosetting resin which, based on the solids content of the impregnating liquor, contains up to 25% by weight, preferably from 5 to 20% by weight, in particular from 5 to 10% by weight, of a finely divided above-described fluoropolymer, from 1 to 15% by weight, preferably from 3 to 10% by weight, in particular from 4 to 7% by weight, of one or more plasticizers and adhesion improvers and optionally up to 2% by weight, preferably from 0.1 to 1% by weight, of further customary modifiers for thermosetting resins in such a way that the impregnated material has a fiber content, calculated solid on solid, of up to 40–60% by weight, preferably 45–55% by weight. The impregnated product thus obtained is subjected to a drying process until non-tacky, in the course of which the predominant portion of the solvent and any water evaporates and the resin is subjected to a further condensation for the purpose of adjusting the flow and curing behavior, then stacked a plurality of layers deep and brought into the desired sheetlike or three-dimensional form by application of pressure and heat. To produce sheetlike materials the dry prepreg is cut into appropriate sections which are stacked on top of one another and subjected to a heat treatment under pressure in the course of which the layers become fused to one another by the flowing resin. Three-dimensional, for example tubular, structures can be obtained from the materials of the present invention by winding the dry, possibly heat-plasticized, prepreg on a winding mandrel to the desired number of coils and subjecting the wound structure on the mandrel to a heat treatment with or without additional pressure.

The resulting semi-finished sheetlike or three-dimensional articles produced from the fiber-reinforced material of the present invention can subsequently be mechanically treated to produce the desired construction elements, such as guide and sealing collars, seals or else slide bearing bushes and bearing shells and cages.

Both the semi-finished sheetlike or three-dimensional articles produced from the materials of the present invention and the construction elements produced from said articles likewise form part of the subject-matter of the present invention.

The end products produced from the fiber-reinforced materials of the present invention are noteworthy for particularly high flexibility and high resilience, for a low delamination tendency and for high resistance to high temperatures and solubilizing and/or swelling fluids. Furthermore, the construction elements of the present invention exhibit a very high mechanical strength combined with very favorable wear characteristics and a high wear resistance, excellent sliding properties, a low coefficient of friction and very advantageous self-lubricating properties.

Also of note is their very good workability, as a consequence of which they can be machined to produce extremely smooth surfaces which in general require no smoothing aftertreatment and which are extremely homogeneous and continuous.

In practical use, these properties of the material ensure easy assembly and dismantling, reduced static and dynamic friction, improved absorption of radial stresses, improved abrasion resistance, absence of contact corrosion, improved emergency running properties, dimensional stability and shape retention, no creep or cold flow under high stresses, high aging resistance even at high temperatures and in the presence of aggressive media, and low moisture regain.

Consequently, the construction elements of the present invention are qualitatively far superior to existing products.

The operative example which follows illustrates the production of a fiber-reinforced material of the present invention in tube form and the processing of this product into different three-dimensional construction elements.

EXAMPLE

The impregnating trough of an impregnating range is charged with a resin mixture of 100 kg of phenolic resin (®Phenodur VPR 45 from Hoechst AG), 27.7 kg of polyvinyl butyral (®Movital 30 TA from Hoechst AG), 7.4 kg of pulverulent tetrafluoroethylene (®Hostaflon micropowder TF 9202 from Hoechst AG), 0.2 kg of a defoamer and 7.9 kg of an organic solvent based on a partially etherified low molecular weight alkanediol. The phenolic resin was used in the form of a 65% strength solution in methanol and the polyvinyl butyral in the form of a 15% strength solution in ethanol.

This resin mixture was used to impregnate a fabric formed from a twisted high-tenacity polyacrylonitrile staple fiber yarn (®Dolanit 15 from Hoechst AG) having a basis weight of about 225 g/m$^2$ at a speed of 5 m/min and the fabric was then dried at a temperature between 130° and 150° C. The prepreg obtained had the following properties:

Resin content: about 46%

Resin flow: 14–17%

To determine the resin flow 4 layers of prepreg 10×10 cm in size are pressmolded at 150° C. under a specific pressure of 5–6 bar for 10 minutes. The quantity of resin squeezed out is determined and, expressed as a percentage of the starting weight, represents the so-called resin flow.

Volatiles: about 8%

The volatiles content is taken to be the weight loss of a prepreg cured at 160° C. for 10 minutes, expressed as a percentage.

This prepreg was wound 15 layers deep on a preheated steel core by means of two heated counter-rolls. The wound structure on the core is cured in a drying oven at 150° to 160° C. for from 4 to 8 hours. The wall thickness of the novel tube of material thus obtained is then reduced on a lathe with a supply of cooling fluid to the wall thickness required for a guide ring for hydraulic cylinders, and cut into sections. Each of the rings thus produced is then cut open approximately parallel to the axis in such a way as to leave a gap of about 3 mm between the resulting edges. FIG. 1 depicts the guide ring (1) thus produced with the ends of the cut (2,2') forming a gap (3).

This guide ring produced from the material of the present invention, compared with a guide ring produced from conventional materials (cotton-reinforced phenolic resin) with the same tools under the same conditions, has a remarkably high surface quality, so that there is no need whatsoever for any further smoothing aftertreatment of the surface. There is a complete absence of the short fibrous hairs which are typically torn by the cutting tools out of the surfaces of conventional composite articles. Moreover, the surface of the ring is found to be extremely homogeneous. The resin matrix and the fiber material appear to be substantially fused together.

Moreover, the surface is remarkably tight and takes up very little moisture, so that the wet-milled articles require virtually no subsequent drying.

The guide ring of the present invention possesses very good flexibility and high resilience. It can be compressed to a smaller diameter, causing the ends (2,2') of the cut to move over one another, and, when the compressive force is removed, springs back to its original shape. For this reason it is particularly easy to install, since it can be pushed into a hydraulic cylinder in the compressed state until it reaches the inner groove of the cylinder and snaps into it.

Similarly, the ring of the present invention is vastly superior to a ring made of conventional fabric-based laminate tape in a sustained-use test. In this test, two identical examples of a hydraulic test system containing highly chromed testing rods are equipped with the guide rings to be compared and are operated under load.

After about 50,000 up-and-down strokes the initially white-gleaming piston rod of the hydraulic test system equipped with the conventional fabric-based laminate tape appeared dark-colored, the lubrication decreased dramatically on account of the strongly increasing absence of pores in the piston rod material, and the run had to be discontinued on account of excessive oil leakage. The piston rod of the hydraulic test system equipped with the guide ring of the present invention was still white following this number of up-and-down strokes, merely showing a fine colorless haze. Even after 200,000 up-and-down strokes the hydraulic system equipped with the ring of the present invention still worked satisfactorily, without any sign of excessive damaging wear of the piston rod.

In the same way it is also possible to produce unslit guide rings for mounting on hydraulic rods with fitting grooves. This is where the high extensibility of the material of the present invention is an appreciable advantage. The ring to be fitted can be easily widened from the diameter of the groove base to the diameter of the rod and be slid onto the rod up to the groove, into which it snaps satisfactorily without having to be calibrated.

Figure 2:
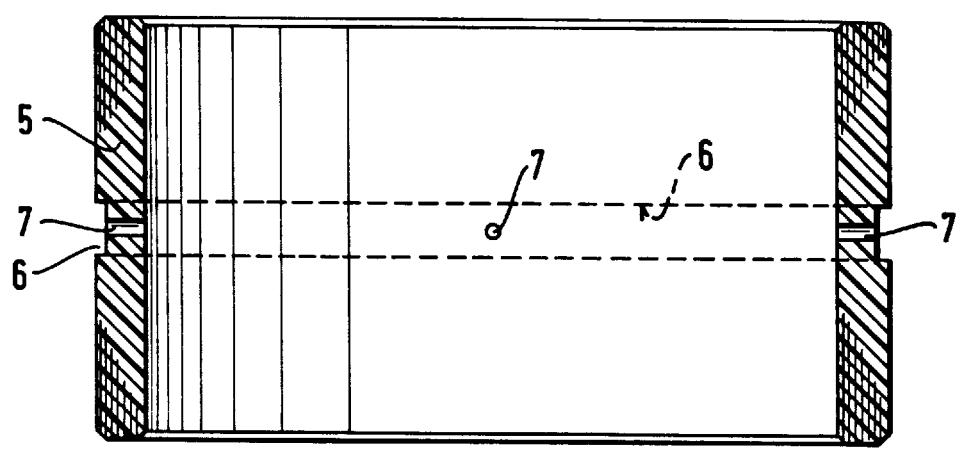

A further example which may be mentioned here is the slide bearing sleeve (5) shown in FIG. 2 with a surrounding lubricating groove (6) and holes (7), which can be produced similarly to the above-described guide rings. This slide bearing sleeve has a very long lifetime, it reduces machine stoppage times to a minimum, it saves energy and costs, and it reduces the noise level due to the bearing.

What is claimed is:

1. A laminated article of manufacture comprising a plurality of layers of fiber-reinforced material, comprising a textile material in the form of a web and thermoset resin, said textile material being from 30 to 70% by weight of said fiber-reinforced material and consisting essentially of synthetic, organic polymeric fiber, at least 30% by weight of said textile material being polyester or polyacrylonitrile fiber and wherein the thermoset resin contains up to 25% by weight of a powder or particulate fluoropolymer, said plurality of layers being stacked on top of one another and having a shape in the form of the article of manufacture.

2. A laminated article of manufacture as claimed in claim 1, wherein said article of manufacture is three-dimensional in shape.

3. A laminated article of manufacture as claimed in claim 2, wherein said article of manufacture is generally tubular in shape.

4. A laminated article of manufacture as claimed in claim 2, wherein said article of manufacture is a guide or sealing element, a bearing, or a guide ring.

5. A hydraulic system containing hydraulic fluid and an article of manufacture which comes into contact with hydraulic fluid, said article of manufacture being the article of manufacture as claimed in claim 1.

6. A hydraulic system containing hydraulic fluid and an article of manufacture as claimed in claim 1, said article of manufacture comprising a web or three-dimensional sealing, guiding, or bearing element which can come into contact with hydraulic fluid.

* * * * *